Sept. 1, 1931.   G. R. FISHER   1,821,698

LIGHT INDICATING SYSTEM AND METHOD

Filed July 13, 1927

INVENTOR
Gerhard R. Fisher
BY White, Prost & Fryer
ATTORNEYS

Patented Sept. 1, 1931

1,821,698

UNITED STATES PATENT OFFICE

GERHARD R. FISHER, OF PALO ALTO, CALIFORNIA, ASSIGNOR TO FEDERAL TELEGRAPH COMPANY, OF SAN FRANCISCO, CALIFORNIA, A CORPORATION OF CALIFORNIA

LIGHT INDICATING SYSTEM AND METHOD

Application filed July 13, 1927. Serial No. 205,343.

This invention relates generally to methods of and systems for securing an electrical indication in response to a change in light intensity.

A broad object of the invention is to provide an indicating device responsive to changes in light intensity.

A feature of the invention is a sensitive light indicating device utilizing a rugged, cold electrode, gas discharge tube, which is ordinarily relatively insensitive to light variations.

Another feature is the combination of an oscillatory circuit comprising a light sensitive element with indicating means responsive only to oscillatory current, the arrangement being such that variations in light intensity cause the starting and stopping of oscillations in the oscillatory circuit.

Referring to the drawings.

I have found that when certain gas discharge tubes having cold electrodes are connected to a source of direct current in series with a resistance of sufficiently high value, that the current flow through the discharge tube is intermittent or oscillatory rather than continuous. This characteristic is especially noticeable with gas discharge tubes containing neon gas. In operating tubes of this kind it has been noted that the frequency of the interruptions is affected by the intensity of light falling upon the tube, especially light containing ultra-violet rays. For example when the light intensity is decreased, it has been noted that the frequency decreases and, conversely, when the light intensity increases the frequency tends to increase. While it is possible to utilize this change in frequency to secure an indication of a variation in light intensity, apparatus which is designed to indicate light intensity by frequency changes is unreliable in operation and difficult to calibrate.

In experiments which I have conducted in order to determine the effect of varying light intensities upon an oscillating neon tube, I discovered that the tube can be adjusted to a critical condition for a given light intensity at which the oscillatory current is zero. However with the tube in this critical condition, only a slight decrease in light intensity is sufficient to cause the tube to start oscillating, thus causing a sudden increase in the oscillatory current from zero to a substantial value. It is this feature of utilizing a critical condition of a gas discharge tube excited by a direct current, which I believe to be the principal feature of my invention.

Figure 1:
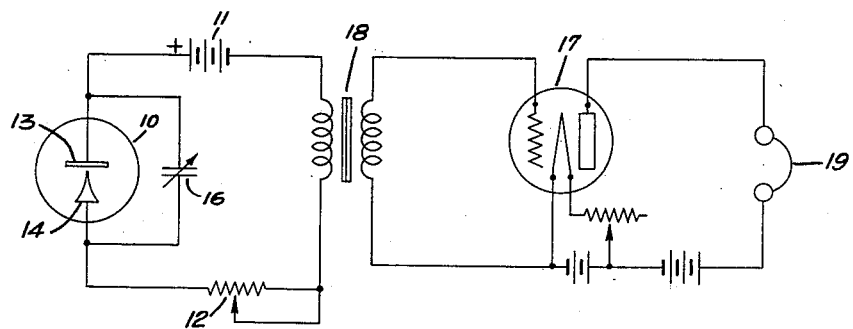
Figure 1 is a circuit diagram of an apparatus suitable for carrying out the method of this invention.

The apparatus which is illustrated in Fig. 1 is suitable for carrying out the method of this invention, and consists of a gas discharge tube 10 excited by a circuit which includes a source of direct potential such as the battery 11 and a relatively high series resistance 12. The gas discharge tube is preferably of the neon type and comprises for example an evacuated vessel containing a small amount of neon gas at a pressure of from 6 to 8 millimeters of mercury. The anode 13 and cathode 14 of this tube are preferably made of suitable metal and during normal operation remain relatively cold. Shunted across the tube electrodes, is a variable condenser 16 which aids in controlling operation of the tube.

With the circuit as described, if the potential of battery 11 is sufficiently high and if resistance 12 is of the correct value, an interrupted flow of current will occur across the electrodes, the frequency of which may be determined principally by the capacitance of condenser 16. As the value of resistance 12 is decreased, a condition will be reached at which the oscillatory current will fall to substantially zero, although a direct current will continue to flow. Now if the light intensity falling upon the tube is decreased, the tube again starts to oscillate and there is a sudden rise in oscillatory current flow in the exciting circuit from substantially zero to a relatively high value. Generally the higher the frequency of oscillation produced by a given decrease in light intensity, the more sensitive the device will be to light changes.

The sudden increase in oscillatory current in the exciting circuit may be translated by any suitable apparatus to secure an indication of the decrease in light intensity. For example I have shown a relay 17 of the electron relay type having its input circuit inductively coupled to the exciting circuit of tube 10. In this particular instance a coupling transformer 18 is provided, having its primary winding included in the exciting circuit in series with battery 11, and its secondary connected to the input circuit of relay 17. A suitable translator such as a telephone 19, is included in the output circuit of relay 17. If it is desired to indicate a decrease in light intensity, the characteristics of the exciting circuit are adjusted as by varying the value of resistance 12, and the value of condenser 16, so that for a given light intensity the tube is near the point of oscillation. When the light intensity decreases the tube 10 is set into oscillation and the oscillations are heard in the receiver.

Figure 2:
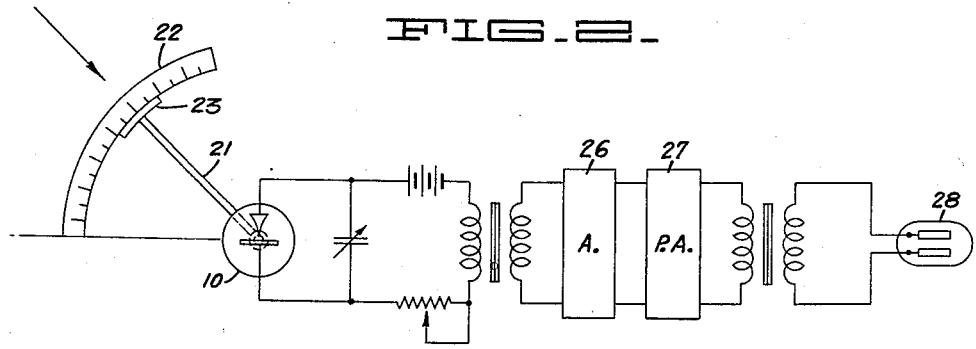
Fig. 2 shows diagrammatically a sextant incorporating the method of this invention.

In Fig. 2 I have indicated how this method may be incorporated with a sextant for taking observations based on the angular position of the sun. In this case the gas discharge tube 10, is placed adjacent the pivot point of the index arm 21. This index arm cooperates with the graduated scale 22 and carries a screen 23 which is adapted to cast a shadow upon tube 10 when moved to a position which will indicate the angular position of the sun. To provide for visual indicating means I have shown the exciting circuit coupled to a plurality of amplifiers 26 and 27 which energize a suitable indicating lamp, such as the neon lamp 28. In operating this apparatus the resistance 12 is decreased just past the point where for a given light intensity substantially no current flow occurs in the exciting circuit and the lamp 28 is extinguished. The index arm 21 is then moved until a shadow falls upon tube 10, and because of the decrease in light intensity, a rush of interrupted current will flow in the exciting circuit and lamp 28 will be illuminated by the amplified energy.

I claim:

1. A method of operating a gas discharge tube having cold electrodes in order to detect variations in light intensity, the method being characterized by the use of an energizing circuit for the tube including a source of direct current, and a relatively high resistance in series with said source, said method comprising adjusting the values of the circuit so that substantially no oscillatory current flow occurs for a given light intensity falling on the tube, but so that oscillatory current flow occurs for a slightly decreased light intensity.

2. In a system of the class described, a gas discharge tube having cold electrodes, means for energizing said tube, said tube being adjusted to a critical condition at which a substantial decrease in light intensity falling on the tube will initiate an interrupted current flow through the same, and means for varying the light intensity falling upon the tube.

3. In a device for indicating in light intensity, the combination of a source of electrical oscillations containing as a controlling element thereof a light sensitive element for starting and stopping oscillations, and indicating means responsive only to oscillatory current from said source.

4. Means as described in claim 2 further characterized in that said gas discharge device contains neon.

5. A system for detecting variations in intensity of light, comprising a light sensitive discharge tube exposed to the light a variation of which is to be detected, means for energizing said tube whereby it produces an oscillatory current, and indicating means responsive to a change in said oscillatory current to indicate a change in intensity of said light.

6. A system for detecting variations in intensity of light comprising a light sensitive discharge device, the impedance of which varies inversely with the current therethrough, a source of current and an impedance element connected in series with said discharge device and a capacitance connected in shunt thereto, whereby oscillations are produced, a variable source of light to which said discharge device is exposed, and indicating means responsive to a change in said oscillations to indicate a change in said light intensity.

In testimony whereof, I have hereunto set my hand.

GERHARD R. FISHER.